Patented Aug. 11, 1925.                               1,548,920

UNITED STATES PATENT OFFICE.

LEOPOLD WEIL, OF HAMBURG, GERMANY.

MANUFACTURING PURE ANTHRACENE AND PURE CARBAZOL.

No Drawing.          Application filed December 26, 1923.  Serial No. 682,793.

*To all whom it may concern:*

Be it known that I, LEOPOLD WEIL, a citizen of Germany, and residing in the city of Hamburg, Germany, have invented certain new and useful Improvements in Manufacturing Pure Anthracene and Pure Carbazol, of which the following is a specification.

This invention has reference to improvements in the process of obtaining pure anthracene of very high degrees of purity from the crude article by distillation with hydrocarbons boiling between 260 and 315° C., and it is intended to devise means of further increasing the degree of purity and of facilitating the course of manufacture of the product. In my previous U. S. Patent 1,419,186 I have described a process of obtaining an anthracene product of high purity by a distillation of the crude article in the presence of hydrocarbons boiling between 260 and 315° C., the product obtained being free from almost all the other ingredients of crude anthracene, and consisting substantially of a mixture of pure anthracene with pure carbazol only.

In the course of my continued researches in this direction I have ascertained that with the addition of caustic alkali to the mixture of crude anthracene and hydrocarbons, and particularly by using petroleum-hydrocarbons the distillation under ordinary pressure or in vacuum will result in a pure anthracene of more than 93 per cent purity, while carbazol-alkali, in particular carbazol-potassium remains in the distillation residue from which the pure product is obtained in the ordinary manner by decomposition with water and by distillation, thus producing carbazol of maximum purity. Though in accordance with the method described in the previous patent referred to a very thorough purification of the crude anthracene is produced which, however, is naturally but a limited one owing to the presence of carbazol in the final product, the process according to my present invention does not only produce a thorough purification of the crude anthracene from its other constituents, but simultaneously therewith the separation, purification and elimination of the carbazol is obtained.

In the previous art several methods have been described for the separation of anthracene and carbazol. Besides employing solvents, such as pyridine, acetone, sulphurous acid and ammonia, the peculiarity of forming a potassium-salt possessed by the carbazol has likewise been utilized as a means of separation. However, the high temperatures required for this purpose cause poor yields. It has also been suggested to separate the anthracene from carbazol by the use of caustic potash and a solvent. From this previous method the process according to my invention is however distinguished by the fact that the possibility is afforded of performing the separation in one single operation. While in the previous process referred to the desired result is only obtained by starting with a kind of anthracene which has already been purified to a high degree of purity, say of 70% purity, the separation of anthracene and carbazol may be effected in my process with any kind of crude anthracene and of any desired source and irrespective of the degree of purity of the same. Even with a crude anthracene of but a low percentage of anthracene, of say twenty (20) per cent for instance, the method according to my present invention will produce an anthracene of over 93% purity and carbazol of high degrees of purity. By this process the manufacture of pure anthracene is greatly facilitated and simplified both from an industrial as well as from the economical point of view, inasmuch as the process is carried out in one single operation, that is to say, by the distillation of crude anthracene of any desired origin and of any degree of purity with hydrocarbons boiling between 260 and 315° C., as a vehicle and in the presence of caustic alkali, the pure anthracene being obtained in this manner in a rather fluffy condition which makes it particularly suitable for the manufacture of anthraquinone.

*Example 1.*—In a suitable still provided with stirrer, man-hole thermometer, reflux condenser and a condenser for the execution of the distillation, and consisting of cast iron 100 kilograms of crude anthracene of 25 per cent contents and 80 kilograms gas oil, particularly the oil of 0.840 specific gravity are heated to 70 degrees C.; then 20 kilogrs caustic potash in finely powdered condition is added to the mixture with constant agitation, and while disconnecting the condenser for the execution of the distillation and connecting the reflux condenser the temperature is slowly raised to 250 degrees C. As soon as the temperature is reached, the condenser for the execution of the distillation is connected and the distillation is effected. Of course, the same condenser may be employed both for the boiling of the reagents, as well as for the distillation by merely changing the direction of inclination of the condenser, the condenser being upwardly inclined for boiling and downwardly inclined for distilling purposes. From the distillate collected in a receiver the anthracene crystallizes in almost white crystals which are separated from the mother liquor by centrifugal means or by suction. By subsequent washing with benzine and drying the anthracene is obtained of a degree of purity of at least 90 per cent.

From the still the residue of the distillation is dissolved out in water by boiling and the carbazol is obtained by decomposition with the boiling water. After sucking off, washing and drying the crude carbazol is obtained at a very high degree of purity and of a melting point 234 to 236 degrees C.

*Example 2.*—Proceed as in the first example, carrying out the distillation however in vacuo.

The examples hereinbefore enumerated are merely exemplifying certain modes of procedure of the process, but it should be understood that the invention is not restricted thereto, and is not dependent upon certain quantities and materials, but it is susceptible of modifications and changes within the meaning of the claims hereunto appended.

I claim:—

1. The process of manufacturing substantially pure anthracene free from carbazol which consists in submitting crude, impure, low-grade anthracene in presence of alkali and in mixture with hydrocarbons boiling between 260 and 315° C. to distillation, thereby distilling off the hydrocarbons together with substantially pure anthracene.

2. The process of manufacturing substantially pure anthracene free from carbazol which consists in submitting crude, impure, low-grade anthracene in presence of alkali and in mixture with hydrocarbons boiling between 260 and 315° C. to distillation under reduced pressure, thereby distilling off the hydrocarbons together with substantially pure anthracene.

In testimony whereof I affix my signature in presence of two witnesses.

Dr. LEOPOLD WEIL.

Witnesses:
I. Hufermann,
E. Kaspank.